United States Patent
Launay et al.

(10) Patent No.: US 9,036,913 B2
(45) Date of Patent: May 19, 2015

(54) SECURED IDENTIFICATION MEDIUM AND METHOD FOR SECURING SUCH A MEDIUM

(75) Inventors: Nathalie Launay, Meudon (FR); Jérôme Borla, Meudon (FR); Frédéric Ros, Meudon (FR)

(73) Assignee: Gemalto SA, Meudon (FR)

( * ) Notice: Subject to any disclaimer, the term of this patent is extended or adjusted under 35 U.S.C. 154(b) by 629 days.

(21) Appl. No.: 12/809,063

(22) PCT Filed: Nov. 28, 2008

(86) PCT No.: PCT/EP2008/066411
§ 371 (c)(1),
(2), (4) Date: Jun. 17, 2010

(87) PCT Pub. No.: WO2009/077305
PCT Pub. Date: Jun. 25, 2009

(65) Prior Publication Data
US 2010/0303359 A1    Dec. 2, 2010

(30) Foreign Application Priority Data

Dec. 17, 2007    (EP) .................................... 07291558

(51) Int. Cl.
| | |
|---|---|
| G06K 9/00 | (2006.01) |
| G07F 7/10 | (2006.01) |
| G06Q 20/34 | (2012.01) |
| G06Q 20/40 | (2012.01) |
| G07F 7/08 | (2006.01) |
| G07F 7/12 | (2006.01) |

(52) U.S. Cl.
CPC ............ *G07F 7/1008* (2013.01); *G06Q 20/341* (2013.01); *G06Q 20/347* (2013.01); *G06Q 20/40145* (2013.01); *G07C 2209/41* (2013.01); *G07F 7/08* (2013.01); *G07F 7/10* (2013.01); *G07F 7/1066* (2013.01); *G07F 7/125* (2013.01)

(58) Field of Classification Search
None
See application file for complete search history.

(56) References Cited

U.S. PATENT DOCUMENTS

| | | | | |
|---|---|---|---|---|
| 4,811,408 | A * | 3/1989 | Goldman | 382/115 |
| 5,390,259 | A * | 2/1995 | Withgott et al. | 382/173 |
| 6,752,321 | B1 * | 6/2004 | Leaming | 235/492 |
| 7,630,559 | B2 * | 12/2009 | Ito et al. | 382/209 |
| 7,668,347 | B2 * | 2/2010 | Zhou | 382/118 |
| 2003/0210802 | A1 | 11/2003 | Schuessler | |
| 2005/0240778 | A1 * | 10/2005 | Saito | 713/186 |
| 2010/0052852 | A1 * | 3/2010 | Mohanty | 340/5.83 |
| 2010/0195916 | A1 * | 8/2010 | Blondiaux et al. | 382/209 |

FOREIGN PATENT DOCUMENTS

| | | |
|---|---|---|
| EP | 0 317 229 A1 | 5/1989 |
| EP | 1 653 395 A2 | 5/2006 |

* cited by examiner

*Primary Examiner* — Thomas Conway
(74) *Attorney, Agent, or Firm* — The Jansson Firm; Pehr B. Jansson

(57) ABSTRACT

This invention relates to a secured identification medium and a method for securing such a medium. The secured identification medium comprises an integrated circuit and, printed on one side, identification information (Ip) about the holder of the medium. It further comprises a set of characteristic attributes Att(Ipi) of the identification information, generated from a capture (Ipi) of the identification information and an extraction algorithm. The set of characteristic attributes of the printed analog image is stored in the integrated circuit and is designed to be compared, during an authentication stage, with a second set of characteristic attributes of the same printed image on the medium.

20 Claims, 5 Drawing Sheets

SECURED IDENTIFICATION MEDIUM AND METHOD FOR SECURING SUCH A MEDIUM

BACKGROUND OF THE INVENTION

1. Field of the Invention

This invention relates to a secured identification medium and a method for securing such a medium.

2. Description of the Related Art

The invention is located in the area of identification media comprising a memory storage element of the integrated circuit type, on which variable identification information is printed such as a photograph of the holder, for example, which are designed for security applications such as identity, governmental use or others. These media, which comprise a contactless or contact integrated circuit, may for example be driving licences, identity cards, membership cards, access cards, passports, bankcards, electronic purses, multi-application cards and other security papers. Due to the value and the importance of all these documents, they are often the subject of unauthorised copying, alterations, changes and counterfeiting.

Such media comprise a body, an integrated circuit and an interface for communicating with the outside. In contact type media, the communication interface takes the form of contact pads that are flush with the surface of the body. In contactless media, the interface takes the form of an antenna embedded in the body. According to the means of communication fitted on it, the medium may be called contactless, contact type, hybrid or dual interface.

In order to prevent the deterioration, alteration or counterfeiting of such media, there are currently several securing techniques.

For instance, the first technique consists in adding security elements such as holograms, guilloches, ultraviolet inks, micro-letters etc. on the identification information printed on the medium in order to minimise fraud. However, the technique offers only first-level security and does not prevent the replacement of the integrated circuit, for example.

Another technique consists in linking the security element to another element of the identification medium. That technique, known as PROOFTAG™ and developed by NOVATEC, consists in generating random bubble codes. To check the code, a database is queried and a check is made with the data saved on the magnetic stripe of the card or with the data printed on its body.

Other security solutions, called digital watermarking, consist in inserting a hidden piece of data in the printing. These solutions seem to be the most suitable and the most widespread for securing physical media that include an integrated circuit and an image of the identity photograph type, because they offer the benefit, among others, of not requiring the addition of specific readable physical elements in and/or on the body of the card. These are the techniques marketed under the names CRYPTOGLYPHE™, SCRAMBLED INDICIA™, IPI™ or ICI™.

Watermarking consists in fact in concealing a message, which is to be transmitted confidentially, in apparently insignificant data in such a way that its presence is imperceptible. As with cryptography, watermarking makes it possible to exchange messages with someone without others being aware of it. But whilst in ordinary cryptography, security relies on the fact that the message will in all likelihood not be understood, with watermarking, security relies on the fact the message will in all likelihood not be detected.

Watermarking is thus used to secure a medium, particularly a medium carrying an image, sound or video, by cleverly inserting a permanent mark in the said medium without any apparent alteration of the medium.

Digital watermarking is applied to digital images. It has grown considerably in recent years, chiefly due to the increasing need to protect the transfer of images over the Internet. This technique consists in inserting a mark into digital images. The mark is imperceptible to the human eye but can be read by a dedicated recognition system. The recognition system makes it possible to make sure that the protected image is authentic.

The content of a mark is typically a few tens of bits of data at the most. It may contain information about the permissions relating to the document or an indication about the person who owns the document. The information may be encoded with a secret key that is unique to each holder. In that way, any person who unlawfully claims to own the document can be exposed.

The conditions for good digital watermarking for media such as IC cards with images are as follows—it must be strong and withstand so-called "print scan" attacks and ageing. In the first case, the mark must offer high resistance to printing and be very easy to read. In practice, the mark undergoes deterioration, particularly due to the printing weave or analogue to digital conversion for instance, which leads to the addition of noise, slight geometric distortions and a change of scale generated by the acquisition process. Such deterioration does not facilitate image synchronisation (identification of image markers). Despite the deterioration, the mark must be able to be read from an analogue capture of the previously printed identity photograph, for example by means of a scanner, a digital camcorder, a webcam or a digital camera.

In the second case, the medium and the photograph undergo attacks relating to ageing. In that case, the damage is both "mechanical" and "colorimetric". It is reflected, for instance, in the fading of the colours and the presence of dirt or scratches due to the frequent unprotected use of the body of the card. But the mark must be interpretable even if the image of the identity photograph has undergone such attacks.

While digital watermarking techniques seem to be more promising for applications such as the securing of IC card bodies, it so happens that these techniques do not withstand all the attacks on the printed image.

Also, verification, after reading the hidden physical security information, often requires accessing a database, which leads to difficulties relating to the storage of the data, securing the stored data and simply accessing the data.

In order to improve the strength and resistance to attacks and eliminate the need to access a database for verifying the secured element, a solution has been envisaged and has been covered by the patent application published under number EP1800944. That solution, a schematic drawing of which has provided in FIG. 1, consists in generating, from a digital image 21, a pseudo-random sequence 22 and an insertion algorithm 23, an image feature vector Vsi(n), a secret key C and a digital image signature that are stored in the integrated circuit. A subsequent stage consists in generating, from the printed and captured analogue image and the secret key C, an image feature vector Vsi(p). The last stage of the process then consists in comparing, using a read-back algorithm 29, the image feature vectors Vsi(n) and Vsi(p).

This method, like all the security methods that exist to date, thus consists in comparing, directly or indirectly, an analogue image (Ip) printed on a medium with a digital image (In), to make sure that there is a link between the printed image and the integrated circuit and thus confirm the validity of the whole made up by the body of the medium and the integrated circuit. However, the printed analogue image (Ip) is deteriorated as compared to the digital image (In). The deterioration of the image is due, first of all to printing, which particularly attacks high frequencies, to image capture, particularly sensor noise and the lighting context, and secondly to the interpolation inevitable for recovering the digital format. The analogue image is finally the result of the transformation of the digital image by so-called RST (Rotation Scale Translation) resulting from the rotations, scaling and translations undergone by the image when it is printed. These natural attacks related to the security method are supplemented by attacks on the printed image due to card ageing, which leads to scratches on the image, faded colours etc. The fact that the printed image (Ip) is only a deteriorated version of the digital image (In) presents serious problems for all the existing solutions. As a result, such a comparison between the analogue image and the digital image is not 100% reliable, and reliability decreases over time due to deterioration relating to ageing. Concretely, for effective comparison between a digital image and an analogue image, regardless of the techniques and/or precautions used, tolerance by nature is required in order not to have an excessively high false rejection rate, where authentic cards fail the examination. Such tolerance inevitably affects the quality of the conclusion—the FAR (false acceptance rate) is necessarily increased, which decreases the security level in a way.

That is particularly identified in the area of watermarking because it must be invisible to be acceptable and resistant, and at the same time decodable in spite of attacks. These two objectives are contradictory and the failure to control deterioration weakens the process.

SUMMARY OF THE INVENTION

That is why the technical problem of this invention consists in offering a method for securing an identification medium comprising an electronic integrated circuit and, printed on one side, identification information about the holder of the medium, which would make it possible to guarantee the authenticity of the identification information and the link between that information and the holder of the medium, throughout the life of the medium, i.e. regardless of the environmental and mechanical conditions to which the medium is subjected.

The solution to the technical problem posed is obtained according to this invention by the fact that the method includes a personalisation stage involving the following stages:
  referencing the printed identification information in relation to the physical edges of the medium,
  capturing the identification information using a capture device,
  generating, from an extraction algorithm, a first set of characteristic attributes of the captured identification information,
  storing all the generated attributes in the integrated circuit.

In that way, the integrated circuit contains a first set of characteristic attributes of the printed analogue image that are designed to be compared during a subsequent authentication stage with a second set of characteristic attributes of the same image printed on the medium and referenced physically in the same way.

A stage prior to the personalisation phase further consists in creating a digital image In designed to be printed on the medium, the said digital image being made with a photographic device, and generating a secret key that is designed to be stored in the integrated circuit of the medium, from that digital image. To do so, the secret key that makes it possible to sign both the image taken and also the resulting printed image, particularly includes Vscan parameters relating to image capture.

Signing analogue information from a physically referenced medium and not digital information as in existing techniques makes it possible to make a comparison between one and the same analogue printed image that has already been deteriorated at the time of its printing, particularly the so-called RST transformation and signal degradation. The physical signature of the printed image makes it possible to not just check the authenticity of the identification information about the holder of the medium but also the physical authenticity of the medium, while at the same time being largely free from the constraints relating to the ageing of the medium.

The invention also concerns a secure identification medium comprising an integrated circuit and, printed on one side, identification information about the holder of the medium. The medium is remarkable in that it further includes a set of characteristic attributes of the identification information generated from the capture of the identification information and an extraction algorithm.

Lastly, the invention relates to equipment for authenticating such a secure medium. The equipment is remarkable in that it includes:
  means to jog the medium,
  an image capture device,
  a means to communicate with the integrated circuit of the medium,
  calculation means designed to generate a set of characteristic attributes of the captured image from extraction software.

BRIEF DESCRIPTION OF THE DRAWINGS

Other particularities and advantages of the invention will become clearer in the description below provided as a non-limitative illustrative example by reference to the attached figures that represent.

DETAILED DESCRIPTION

In this description, an algorithm is an automatic method aimed at transforming one piece of information into another piece of information. The transformation is schematised by saying that a piece of input data is modified by an algorithm into a piece of output data, also called "result".

Extraction algorithm means an algorithm capable of extracting a piece of information, a certain number of data according to a definite protocol and storing them in a medium or device, also according to a dedicated protocol.

Secret key means a key that is unique to each integrated circuit, which is designed for signing identification information, capturing such information and identifying the characteristic features of the identification information. It is used as an input while capturing the printed image and extracting its characteristic features during the personalisation stage and the medium authentication stage. Without knowledge of the key, and thus without the original integrated circuit, there is no way of accessing the information that makes it possible to validate the medium according to the invention.

Identification information means all types of text or photographic or other image data relating to the identity of the holder of the medium. In the examples described later, it will essentially mean a photograph of the holder.

The identification medium according to the invention comprises an integrated circuit and may take different formats that are designed to be physically referenced. If it is an integrated circuit card, the card may be of the contact and/or contactless type.

Figure 1:
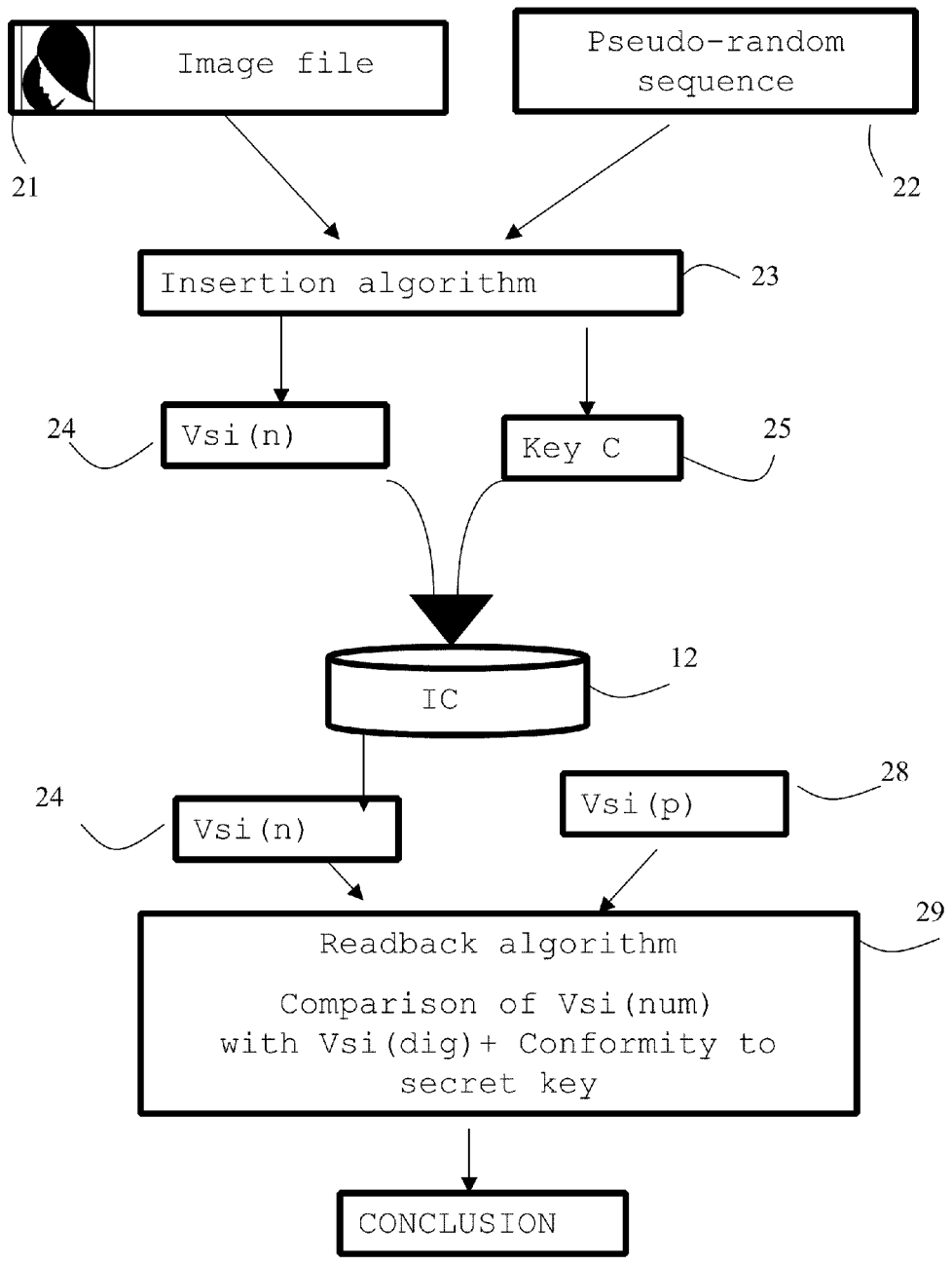
FIG. 1, already described, is a chart illustrating the stages of the known security method.
Figure 2A:
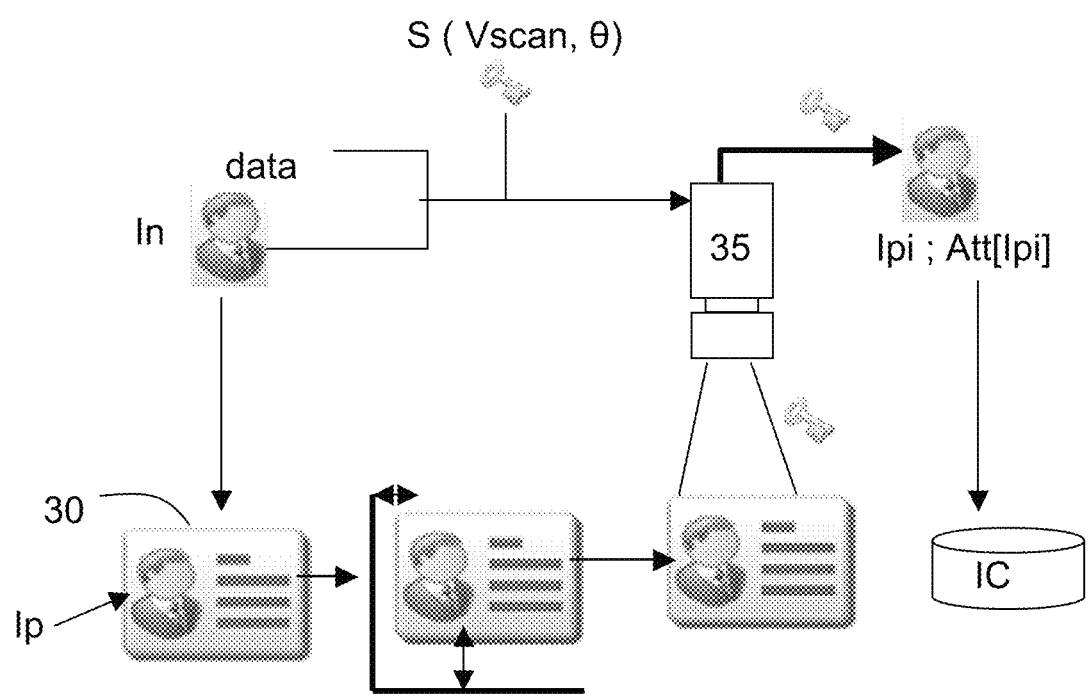
FIGS. 2A and 2B are a drawing and a chart respectively, illustrating the stages of the security method according to the invention during the personalisation stage.
Figure 2B:
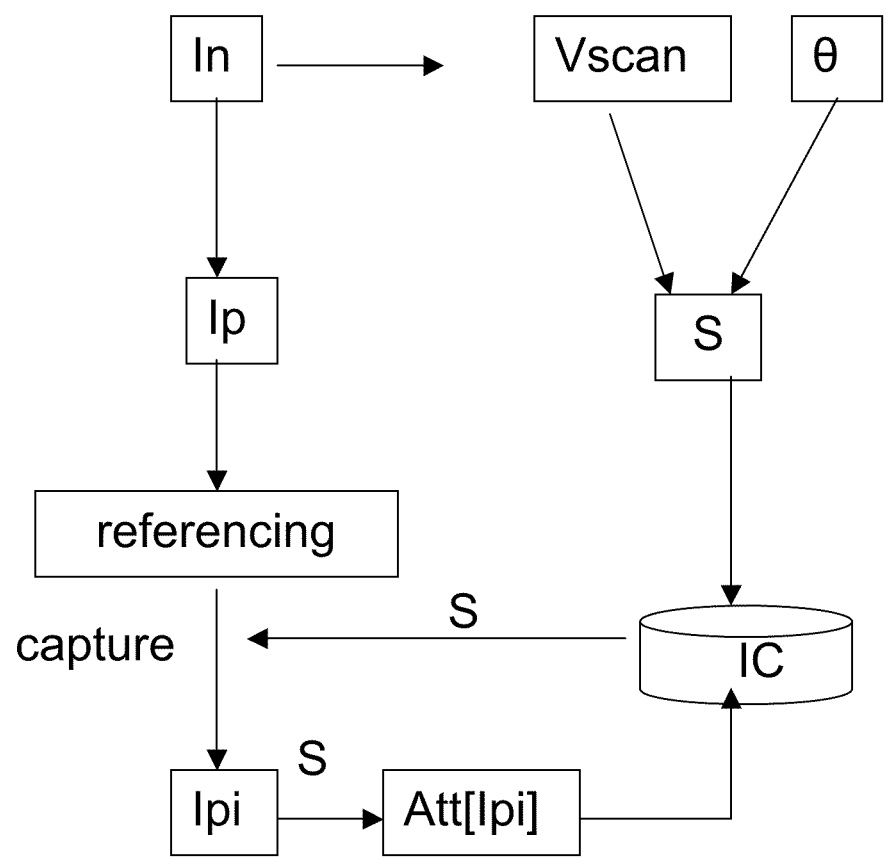

FIG. 2A is a schematic drawing of the stages used during the first stage of the securing method according to the invention. FIG. 2B details the sequence of the stages in the form of an organisation chart. Digital identification information about the holder of the card 30 must be printed on the card. Such identification information generally includes not only text data such as the surname, first name, date of birth or other data about the holder, but also a photograph of the holder. The photograph is taken with a photographic device such as a digital camera or digital camcorder. The digital photograph In and the text data are then printed on the card using the conventional processes of the card industry. The printed photograph Ip may be printed in colour or in black and white.

A stage prior to the securing method consists first of all in generating a signature of the captured digital image, the photograph of the holder in the example. That signature takes the form of a secret key S, stored in the integrated circuit, and then makes it possible to sign the resulting image. To do so, the secret key S is calculated from the initial digital image In and/or the personal data of the holder of the card, and the context of the capture of the initial digital image. That is because depending on the brightness of the digital image resulting from the photograph, it is possible to determine the Vscan parameters with which the image has been taken. These Vscan parameters essentially depend on two variables. The first one is that of the quantity of light sent by the photographic device and the second one is that of standard camera parameters, such as the integration time for example.

Besides, each photograph belongs to a given person and is designed to be printed on a medium that will be attributed to it. As a result, the photograph is also related to the personal data relating to the holder of the medium. All these parameters are used to generate a signature using the equation S=data+In*Vscan, which is intended to be stored in a memory element as secret key S. In that way, the way of capturing the image (camera and light) and the resulting image, which itself depends on the position of the printing of the image in relation to the physical edges of the card, are both signed.

In a subsequent stage, the medium 30 supporting the printed image Ip is put in place against the guiders provided to register the printed image, i.e. the photograph of the holder in the example, in relation to the edges of the medium. For that, if the card is a integrated circuit card in the ISO format, it is jogged on its three ISO points as defined in standard 7816-2 (1988). According to that standard, the three ISO reference points are defined by constructing two perpendicular axes X and Y that intercept each other at O, marking three reference points P2 and P3 measured at a distance of 11.25 mm and 71.25 mm from O on the axis X and P1 at a distance of 27 mm from O on the axis Y. In that way, all the points of the picture and therefore their coordinates can be referenced in relation to the physical edges of the medium 30. As a result, it is important for the personalised medium to be referenced. The accuracy of the position of printing on a card is far less than the accuracy with which it can be located. Typically, it is a $10^{th}$ of a millimetre in the first case and a $100^{th}$ of a millimetre in the second one. It is thus very difficult to reproduce printing with the same location accuracy. Thus, what is a drawback in printing is used advantageously for the authentication and resulting conclusion.

Further, in general, the locating elements are not known, the edges of the image are generally not precise because there is not necessarily a border and sometimes, they do not exist. This stage of referencing points of the image in relation to the physical edges of the medium is thus required to carry out the subsequent stages of the method.

An image capture device 35 such as a scanner, digital camcorder, webcam or digital camera can then be used to capture the printed image Ip. To do so, the analogue image is captured from the secret key S, generated at the time of the photograph and stored in the integrated circuit, which comprises, among others, the Vscan image capture parameters with which the capture is to be made. These parameters particularly include a variable relating to the integration time of the image capture device (about 200 μs to 1 s) and a variable relating to the light intensity. The knowledge of Vscan parameters is indispensable for obtaining a captured image Ipi of consistent quality.

Once the printed picture is captured Ipi, a first set of characteristic attributes of the captured image Att[Ipi] is generated from an extraction algorithm. That set of attributes is formed by image blocks located at locations that are very resistant to environmental attacks such as scratches or others. These attributes are characteristic spatial attributes of the image, also called feature points, which are used to recover the essential pieces of information even in the event of ageing. They include a set of blocks in the image, where each block is formed by a corner or a border in the image, for example.

To extract these characteristic image attributes, the extraction algorithm can use different known means of detection. In one example, it may use a detection algorithm of the Harris type. The set of attributes Att[Ipi] generated in this way depends in fact on the printed image Ip and a set of parameters θ defining the context of extraction of the characteristic attributes, which are further referenced in relation to the physical edges of the card. The set of parameters θ is also part of the secret key S as are the Vscan image capture parameters.

It is extremely difficult to find digital and analogue extraction parameters θ that retain the same characteristic image attributes from the digital image to the scanned analogue image. For example, these so-called feature point techniques that consist in extracting the characteristic attributes of an image have been proposed for synchronising watermarking, but they provide inconclusive results due to the very large deterioration of the signal due to the print/scan attacks mentioned in the introduction to the description. That is why, according to this securing method, a set of attributes is generated from an analogue image Ipi that is scanned using Vscan capture parameters determined on the basis of analogue extraction parameters θ, so as to compare that set with another set of attributes of the same analogue image scanned during a subsequent authentication stage.

The first set of attributes Att[Ipi] generated in this way from the captured analogue image Ipi is then stored in the integrated circuit of the medium.

In a variant of embodiment, the characteristic image attributes that are generated may further integrate attributes of the frequency type. The major ageing problem with cards is the fading of colours and the presence of many scratches. It is known that colour fading essentially affects low frequencies of the image and scratching affects high or even very high frequencies. On the other hand, medium frequencies are a lot less damaged by ageing attacks. On the other hand, the spectrum of medium and high frequencies of the image is heavily deteriorated by the attacks relating to the security method. The frequency dimension of the image ($f_x*f_y$) is identical to the spatial dimension ($s_x*s_y$). The medium frequency band is determined from that piece of data and also in relation to the signal deterioration level for a given printer. Thus, from elementary calibres and for each printer, a high and low frequency is defined by analysing the deterioration between the analogue signal and the digital signal. These limits determine the medium frequency band. By extracting the medium frequency on the printed image Ip, it becomes possible to counter the natural attacks due to the ageing of the card.

Another variant consists in optimising the resolution of the scanner or the image capture device used, and considering only the central area of the photograph, i.e. the essential characteristics of the portrait (eyes, nose etc.) that contain the essential identification information. That reduces the processing time.

Figure 3A:
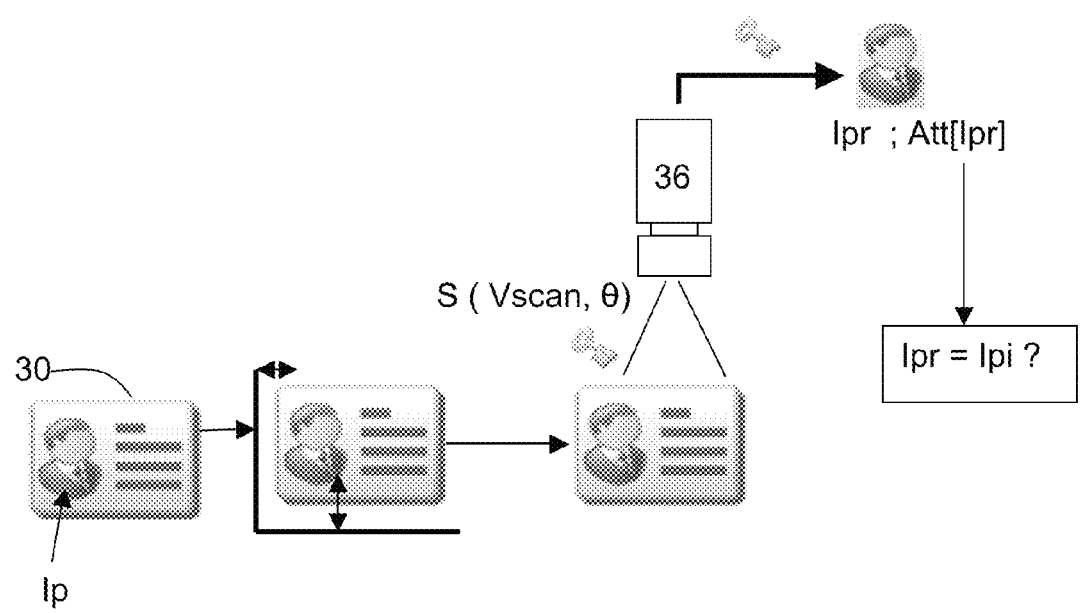
FIGS. 3A and 3B are a drawing and a chart respectively, illustrating the stages of the security method according to the invention during authentication.
Figure 3B:
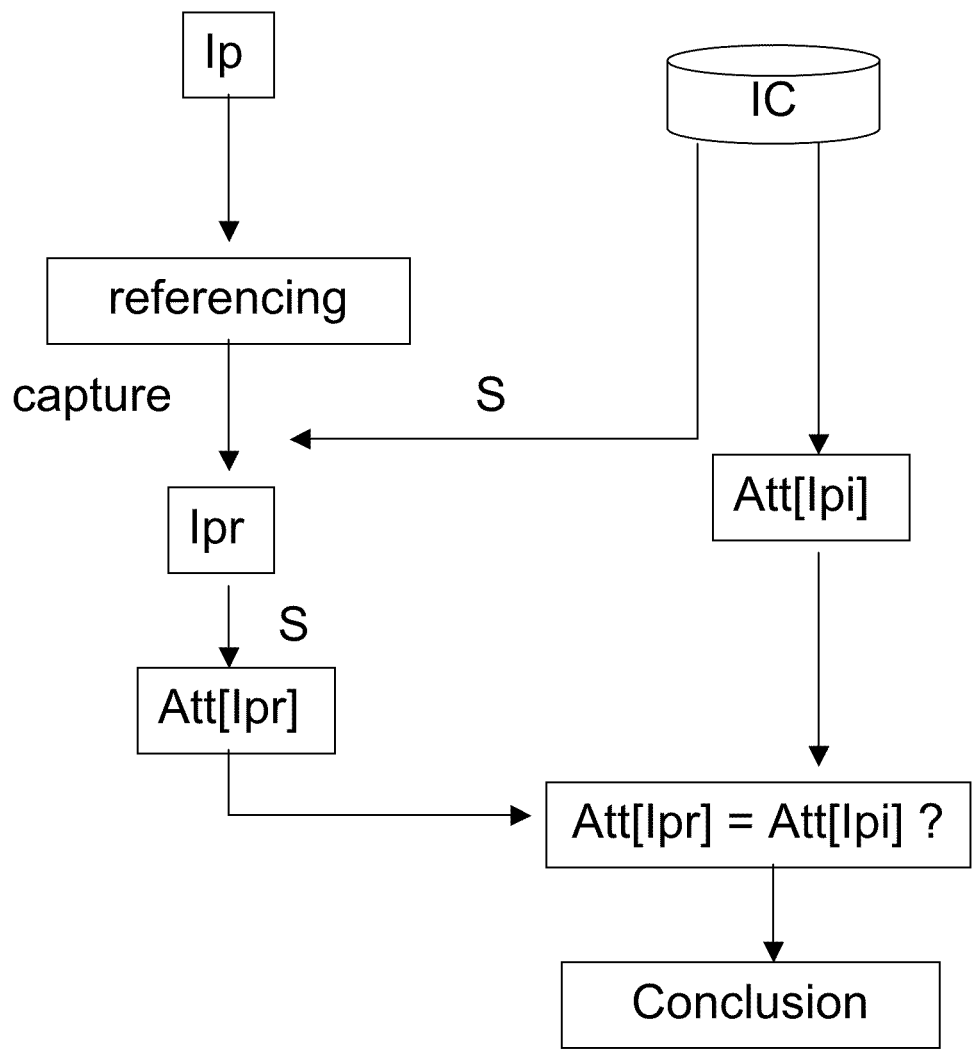

In a subsequent stage of the securing method illustrated in FIGS. 3A and 3B, the identification support is authenticated to first check that the printed photograph is indeed the photograph that was really printed on the medium during personalisation, and that it has not been copied, altered or faked on another medium, and check that the photograph is that of the holder of the support, and secondly to make sure of the link between the printed image and the integrated circuit in order to confirm the validity of the medium/integrated circuit pair. Such authentication may be carried out throughout the life of the medium and the printed image, regardless of the climatic and mechanical ageing constraints undergone by the medium.

The first stage thus consists in placing the identification medium 30 against the guiders of the authentication equipment so that all the points of the printed image Ip are referenced in relation to the physical edges of the medium.

The printed analogue image Ip is then captured with an image capture device 36, using the secret key S stored in the integrated circuit and read by the authentication equipment, which includes a means to communicate with the integrated circuit. Thus, the image capture device scans the printed image Ipr with predetermined Vscan capture parameters and particularly a given light intensity and speed, which are defined in the secret key S. An extraction algorithm of the same type as that used during personalisation can then generate a second set of attributes Att[Ipr] that are characteristic of the captured printed image Ipr. Calculation means in the equipment make it possible to carry out such processing.

A comparison algorithm then makes it possible to compare the second set of attributes Att[Ipr] with the first one Att[Ipi] stored in the integrated circuit to reach a conclusion regarding the authenticity.

Thanks to the process just described, it is possible to verify the authenticity of identification information printed on a medium and to make sure that the medium is original and that the integrated circuit has not been replaced, throughout the life of the medium. Such verification is highly reliable and in any case far more reliable and resistant, for the same level of technical complexity, than what can be obtained with a digital-analogue approach.

The combination of two types of attributes increases the strength of the security method. Besides, when frequency type attributes are taken into account, only the medium frequencies that are characteristic of the image are used. They constitute a marker that can withstand all ageing attacks. In this case, the deterioration of the image at very high and very low frequencies is not taken into account in the first stage.

Besides, the integrated circuit is only used as a memory storage element. Any other memory element can thus be used instead of the integrated circuit.

Lastly, thanks to the process described, there is no need to use an external database or encrypted data to guarantee security.

The invention claimed is:

1. A secure identification medium comprising:
   printed on one side, identification information about the holder of the medium, and
   an integrated circuit storing a set of characteristic attributes Att(Ipi) of the identification information, wherein the set of characteristic attributes is generated from an image capture of the printed identification information in combination with an extraction algorithm.

2. The secure identification medium according to claim 1, comprising a secret key S generated from a digital image capture (In) corresponding to the printed identification information before printing.

3. The secure identification medium according to claim 2, wherein the secret key S comprises a definition of image capture parameters (Vscan).

4. The secure identification medium according to claim 2 or 3, wherein the secret key S further comprises parameters defining the context of extraction of the characteristic attributes.

5. The secure identification medium according to any of claims 1 through 3, wherein the characteristic attributes of the identification information comprise spatial attributes and/or frequency attributes.

6. The secure identification medium according to claim 5, wherein the frequency attributes belong to the group of medium frequencies.

7. The secure identification medium according to any of claims 1 through 3, wherein the identification medium takes the form of a smart card with an integrated circuit.

8. The secure identification according claim 1, wherein the identification information takes the form of a visible colour or black-and-white photograph of the holder of the medium.

9. A method for securing secure identification medium having an integrated circuit and, printed on one side, identification information (Ip) relating to the holder of the medium, the method comprising a personalisation stage involving the following stages:
   capturing the printed identification information using a capturing device,
   generating, from an extraction algorithm, a first set of characteristic attributes Att(Ipi) of the captured identification information (Ipi),
   storing all the attributes Att(Ipi) generated in the integrated circuit.

10. The method according to claim 9, further comprising a stage prior to the personalisation stage, involving the generation of a secret key S, designed to be stored in the integrated circuit of the medium, from the capture of a digital image (In) corresponding to the printed identification information (Ip) before printing.

11. The method according to claim 9, further comprising, subsequently to the personalisation stage, an authentication stage involving the following stages:
   capturing the identification information using a capture device,
   generating, from an extraction algorithm, a second set of characteristic attributes Att(Ipr) of the captured identification information (Ipr),
   comparing the first set of characteristic attributes Att(Ipi) generated and stored in the integrated circuit at the time of the personalisation stage with the second set of characteristic attributes Att(Ipr) generated.

12. The method according to claim 11, wherein the image capture stage during the personalisation and authentication stages is carried out from a secret key S stored in the integrated circuit of the medium.

13. The method according to claim 12, where the secret key includes image capture parameters (Vscan) and parameters defining the context of extraction of the characteristic attributes of a captured image.

14. The method according to claim 9, where the extraction algorithm uses a detection algorithm of the Harris type.

15. The method according to claim 9, where the sets of characteristic attributes that are generated comprise spatial and/or frequency attributes.

16. The method according to claim 15, wherein the frequency attributes belong to the group of medium frequencies.

17. The method according to claim 9, wherein the personalization stage further comprises:
    referencing the printed identification information (Ip) in relation to the physical edges of the medium.

18. The method according to claim 17, wherein the medium is a smart card in the ISO format, and in that the stages of referencing in relation to the physical edges of the medium consist in jogging the medium on its ISO points.

19. The method according to claim 11, wherein the authentication stage further comprises:
    referencing the printed identification information (Ip) in relation to the physical edges of the medium.

20. A method for securing secure identification, the method comprising a personalisation stage involving the following stages:
    providing equipment for the authentication of a secure identification medium, comprising means to jog the secure identification medium, wherein the secure identification medium comprises an integrated circuit and, printed on one side, identification information about the holder of the medium, a set of characteristic attributes Att(Ipi) of the identification information, generated from a capture of the identification information and an extraction algorithm, an image capture device, a means to communicate with the integrated circuit of the medium, calculation means designed to generate, from extraction software, a set of characteristic attributes of a captured image,
    capturing the printed identification information using a the capturing device,
    generating, from an extraction algorithm, a first set of characteristic attributes Att(Ipi) of the captured identification information (Ipi),
    storing all the attributes Att(Ipi) generated in the integrated circuit.

* * * * *